United States Patent
Daoud

(10) Patent No.: US 6,191,357 B1
(45) Date of Patent: Feb. 20, 2001

(54) BUILDING ENTRANCE PROTECTOR BOX HAVING MODULAR PROTECTOR PANELS WITH ISOLATION BETWEEN INPUT AND OUTPUT WIRES

(75) Inventor: Bassel H. Daoud, Parsippany, NJ (US)

(73) Assignee: Avaya Inc., Basking Ridge, NJ (US)

( * ) Notice: Under 35 U.S.C. 154(b), the term of this patent shall be extended for 0 days.

(21) Appl. No.: 09/039,133

(22) Filed: Mar. 13, 1998

(51) Int. Cl.[7] .................................................. H01J 5/00
(52) U.S. Cl. ............................ 174/50; 174/58; 220/4.02
(58) Field of Search ............................ 174/48, 50, 58, 174/63, 17 R, 57, 67; 220/3.6, 3.8, 3.9, 4.02, 242; 248/906; 52/220.1

(56) References Cited

U.S. PATENT DOCUMENTS

| | | | |
|---|---|---|---|
| 5,263,676 | * 11/1993 | Medlin, Jr. et al. | 248/300 |
| 5,452,873 | * 9/1995 | Laughlin | 248/205.1 |
| 5,669,522 | * 9/1997 | Million et al. | 220/4.02 |
| 5,717,164 | * 2/1998 | Shetterly | 174/58 |
| 5,796,585 | * 8/1998 | Sugiyama et al. | 361/735 |
| 5,942,724 | * 8/1999 | Russo et al. | 174/48 |
| 6,060,660 | * 5/2000 | Bauer | 174/52.1 |
| 6,066,803 | * 5/2000 | Hagarty | 174/50 |

FOREIGN PATENT DOCUMENTS

779143 * 2/1968 (CA) .................................... 248/906

* cited by examiner

Primary Examiner—Kristine Kincaid
Assistant Examiner—Dhiru R Patel
(74) Attorney, Agent, or Firm—Davis L. Davis

(57) ABSTRACT

A building entrance box providing an interface between a signal transmission media cable having a first plurality of filamentary signal transmission elements and a second plurality of individual filamentary signal transmission elements. In a first embodiment, moisture infiltration is reduced by providing potting material in a transition region between a splice chamber of the box and a connector chamber of the box. In another embodiment, a plastic protector panel is specifically shaped to reduce condensation and to reduce the effects of any condensation. Modular protector panels mounted in the box are automatically grounded when mounted to a conductive chassis plate and are so arranged that input and output wires are isolated from each other. Mounting of stacked boxes in a predetermined alignment is effected by a first embodiment of a bracket assembly having a variable overall length but a fixed horizontal alignment, and by a second embodiment of a bracket which is breakable by an installer to achieve a desired bracket length.

4 Claims, 8 Drawing Sheets

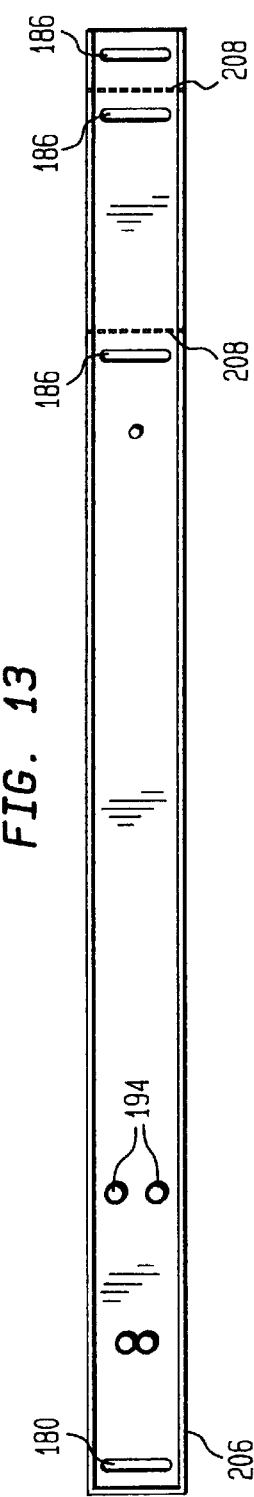
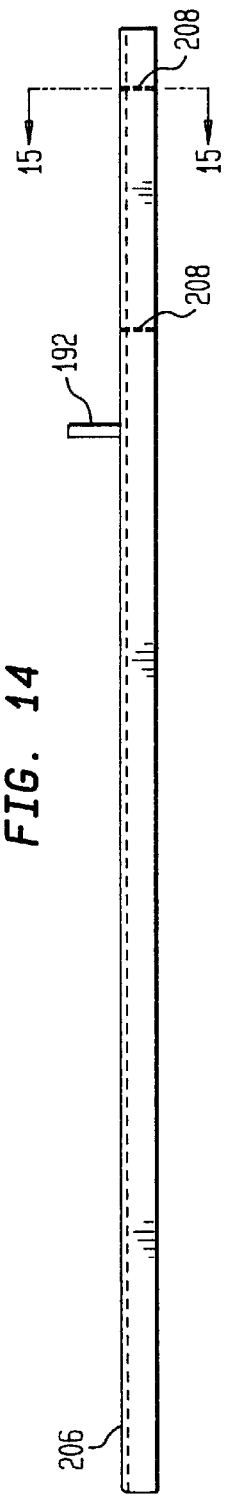
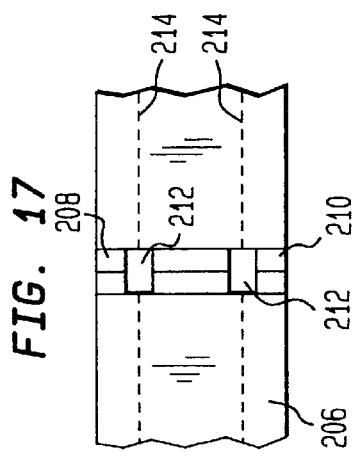
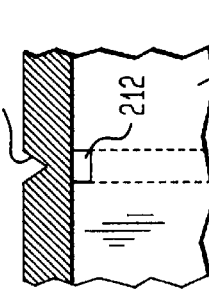
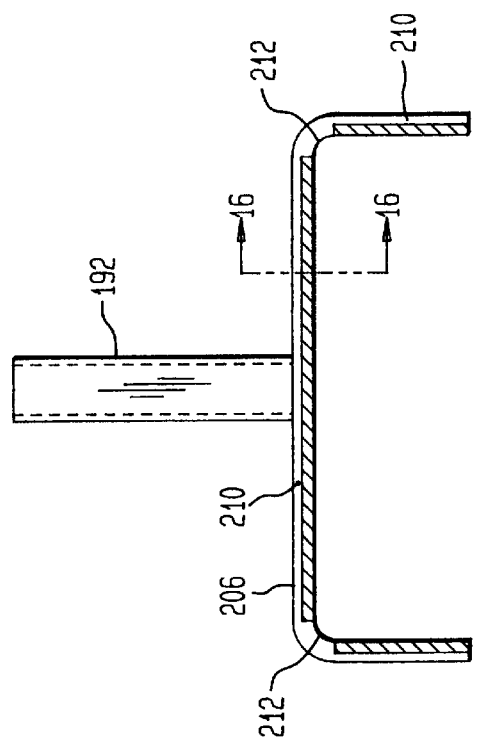
FIG. 13
FIG. 14
FIG. 15
FIG. 16
FIG. 17

BUILDING ENTRANCE PROTECTOR BOX HAVING MODULAR PROTECTOR PANELS WITH ISOLATION BETWEEN INPUT AND OUTPUT WIRES

BACKGROUND OF THE INVENTION

This invention relates to a building entrance protector box and, more particularly, to modular protector panels within the box which maintain isolation between input and output wires.

Where telephone wires enter a building, there is usually provided a building entrance protector box. The incoming wires, which are typically contained within one or more multi-wire cables, enter a splice chamber in the box, where they are connected to wires which go to a connector chamber holding a protector field, providing protection against lightning, high voltage and high current, and then connections are made to output wires which extend through the building to output jacks at various locations in the building.

When modular protector panels are utilized in such a box, care must be taken to isolate the input wires from the output wires to avoid shorting thereof. Further, when several such modules are installed in a box, the input wires of each of the boxes must be isolated from the output wires of all of the other boxes. Accordingly, there exists a need for an improved module which provides such isolation without requiring a separator housing around each set of input or output wires of every module.

SUMMARY OF THE INVENTION

According to the present invention, each protector module has its input wires exiting the module from a location 180° removed from the location where the output wires exit the module. Accordingly, when the modules are installed in the box, they can be appropriately oriented so that all of the input wires can be bundled together between rows of modules and all of the output wires are on the opposite sides of the modules.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 13 is a plan view of a second embodiment of a bracket for mounting the box of FIG. 1 to the frame of FIG. 9;

FIG. 14 is a side view of the bracket of FIG. 13;

FIG. 15 is a cross sectional view taken along the line 15—15 in FIG. 14;

FIG. 16 is a cross sectional view taken along the line 16—16 in FIG. 15; and

FIG. 17 is a partial plan view showing the bracket of FIGS. 13–16 during a stage of its manufacture.

DETAILED DESCRIPTION

Figure 1:
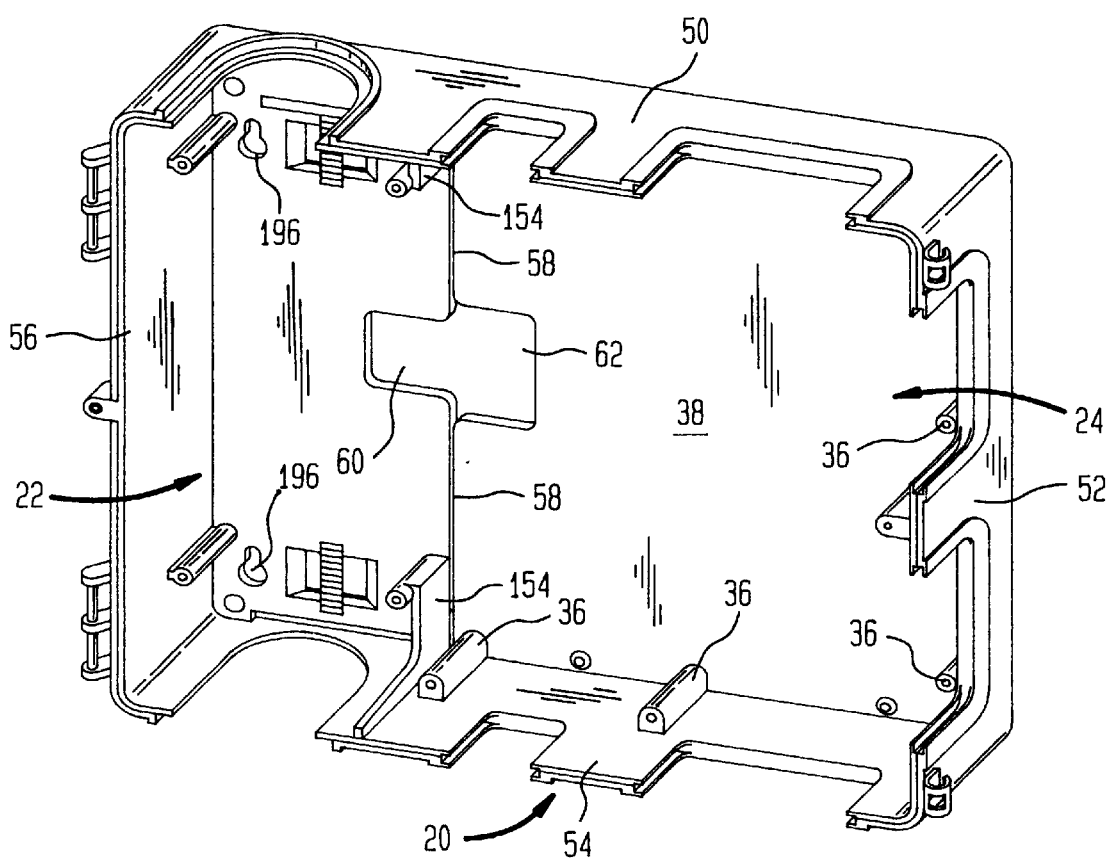
FIG. 1 is a perspective view of a building entrance box (without its cover) which may be used with the present invention.

Referring now to the drawings, FIG. 1 illustrates a building entrance box, designated generally by the reference numeral 20, which finds utility with the present invention. It is conventional to install such a box 20 at the entrance of a building to provide an interface between a signal transmission media cable entering the building and having a first plurality of filamentary signal transmission elements, and a second plurality of individual filamentary signal transmission elements which are routed through the building. The box 20 has a substantially planar base wall 38 adapted for mounting to a support and a plurality of substantially planar surrounding walls 50, 52, 54, 56 each substantially perpendicular to the base wall 38 so as to define an open enclosure. The open enclosure is divided into a splice chamber 22 and a connector chamber 24. The splice chamber 22 receives the cable and the connector chamber 24 receives the second plurality of individual filamentary signal transmission elements. A connector field is disposed in the connector chamber 24 to which the second plurality of individual filamentary signal transmission elements is terminated. A third plurality of individual filamentary signal transmission elements extends from the splice chamber 22 to the connector chamber 24, with each of the third plurality of individual filamentary signal transmission elements being terminated at one end to the connector field and at the other end to a respective cable element within the splice chamber 22. When the signal transmission media cable is made up of telephone wires, the connector field within the connector chamber 24 includes a protector field having protector blocks for providing lightning, high voltage and high current protection. The third plurality of individual filamentary signal transmission elements will in that case each be terminated at the one end to one end of a respective protector block. Dedicated wires extend from the second ends of the protector blocks to respective connectors at which the second plurality of individual filamentary signal transmission elements are terminated.

Figure 2:
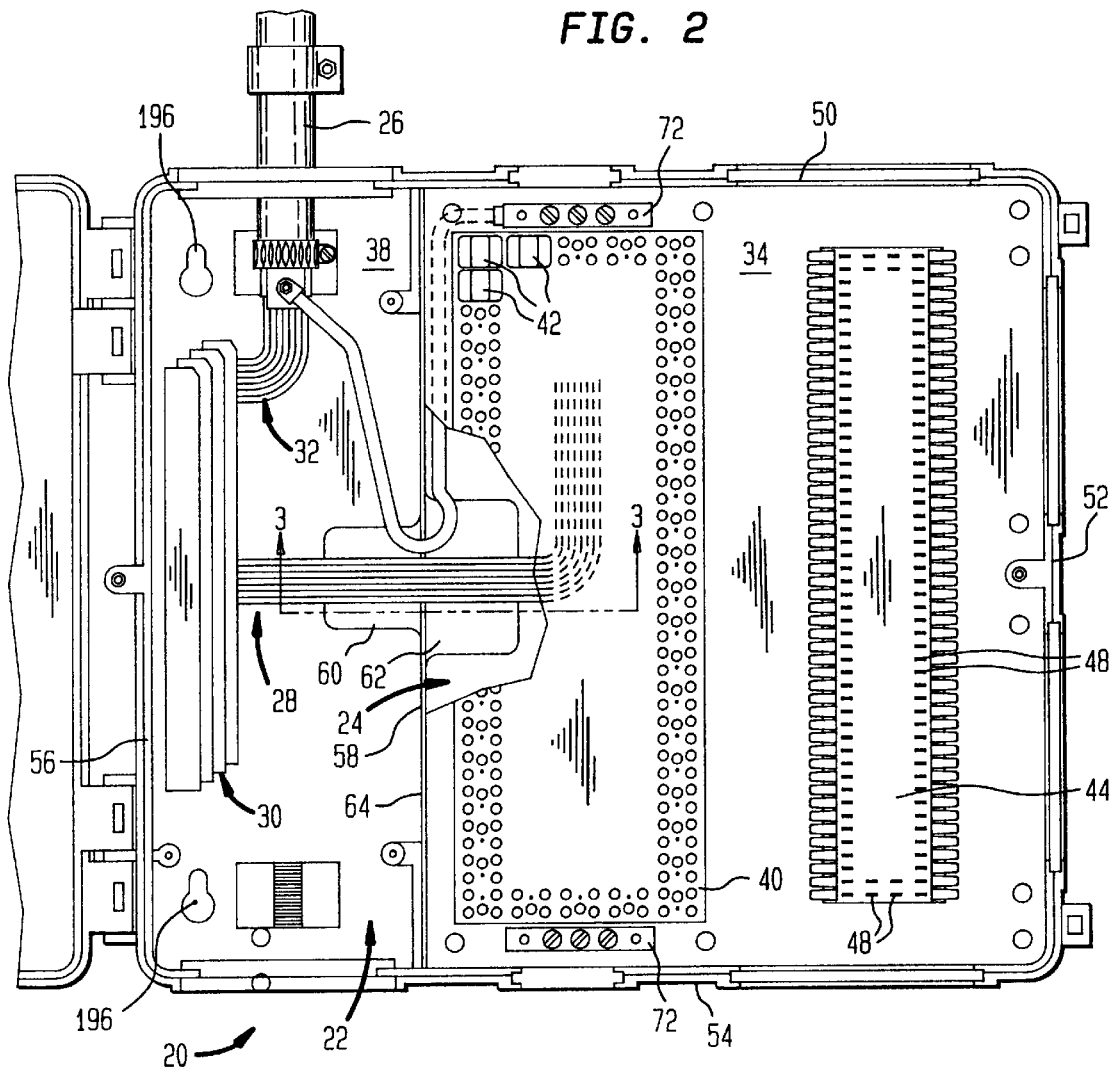
FIG. 2 is a top plan view of the box of FIG. 1 with a first type of protector field installed therein.

As shown in FIG. 2, a signal transmission media cable 26 enters the splice chamber 22. The third plurality of individual filamentary signal transmission elements, or wires, 28 extends from the splice chamber 22 to the connector chamber 24. The wires 28 are terminated at a first end to a bank of connectors 30 to which are spliced the first plurality of individual filamentary signal transmission elements, or wires, 32 making up the cable 26.

A cover plate 34 is secured to the standoffs 36 (FIG. 1) so as to be parallel to the base wall 38 of the box 20 and be disposed over the connector chamber 24. The cover plate 34 has secured thereto a protector field 40 with protector blocks 42, and an output wire connector field 44. The wires 28 are connected to one side of the protector blocks 42 by means of the downwardly depending wire wrap tails 46. Wires (not shown) are connected to the other side of the protector blocks and are then routed below the cover plate 34 to the output wire connector field 44, which includes an array of generally planar insulation displacing connector terminals 48. The second plurality of filamentary signal transmission elements, or wires, (not shown in FIG. 2) which are routed through the building are terminated at the terminals 48.

The base wall 38 is formed with a recess open to the open enclosure defined by the base wall and the surrounding walls 50, 52, 54, 56. As best shown in FIG. 1, the recess marks the dividing line between the splice chamber 22 and the connector chamber 24 and preferably includes an elongated groove 58 extending between the walls 50 and 54, and a pair of recesses 60, 62 open to both the groove 58 and the open enclosure and aligned one with the other across the groove 58. The groove 58 and the recesses 60, 62 all extend to the same depth within the base wall 38.

Figure 3:
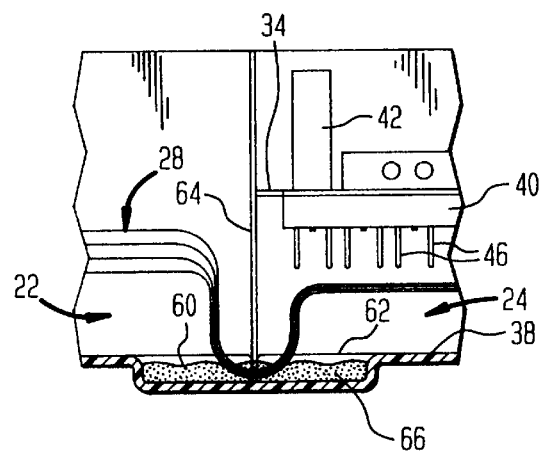
FIG. 3 is a cross sectional view taken along the line 3—3 in FIG. 2.

As best shown in FIG. 3, a separator plate 64 is secured, as by welding or the like, transversely to the cover plate 34. The separator plate 64 extends downwardly from the cover plate 34 toward the base wall 38 to isolate the splice chamber 22 from the connector chamber 24. The separator plate 64 has its lower portion, preferably along its entire length which extends between the walls 50, 54, extending into the groove 58 to a depth less than the depth of the groove 58, with the recesses 60, 62 being on opposite sides of the separator plate 64. The wires 28 are routed into the recess 60, across the groove 58 under the separator plate 64, and into the recess 62, as shown in FIG. 3.

When a box of the type shown in FIGS. 1–3 is used in an outdoor application, moisture can enter the box through the opening provided for the cable 26. This moisture can pass under the separator plate 64 where the wires 28 pass through from the splice chamber 22 to the connector chamber 24 and can condense on the underside of the protector field 40 and the connector field 44. The problem results because the bottom of the protector field 40 and the connector field 44 are flat. If moisture condenses on a flat surface, it can short out the downwardly extending wire wrap tails 46. In the past, to prevent such problems, the underside of the protector field 40 and the connector field 44 have been potted. This is a time consuming and costly procedure, requiring a large amount of potting material. To overcome these disadvantages, potting material 66 is placed in the groove 58 and the recesses 60, 62 to a level higher than the bottom of the separator plate 64. This minimizes the required amount of potting material while effectively minimizing the amount of moisture that can pass into the connector chamber 24. Preferably, the potting material comprises a polyurethane mix. Illustratively, the potting material consists of three parts, all made by BIWAX Corp. The three parts are a resin, a catalyst and an accelerator. Preferably, the resin is BIWAX 622R material; the catalyst is CPD Poly 662C material; and the accelerator is BIWAX 622A material.

As further protection, silicone caulking (or some other suitable material) can be added where the cover plate 34 abuts the walls 50, 52, 54.

Figure 4:
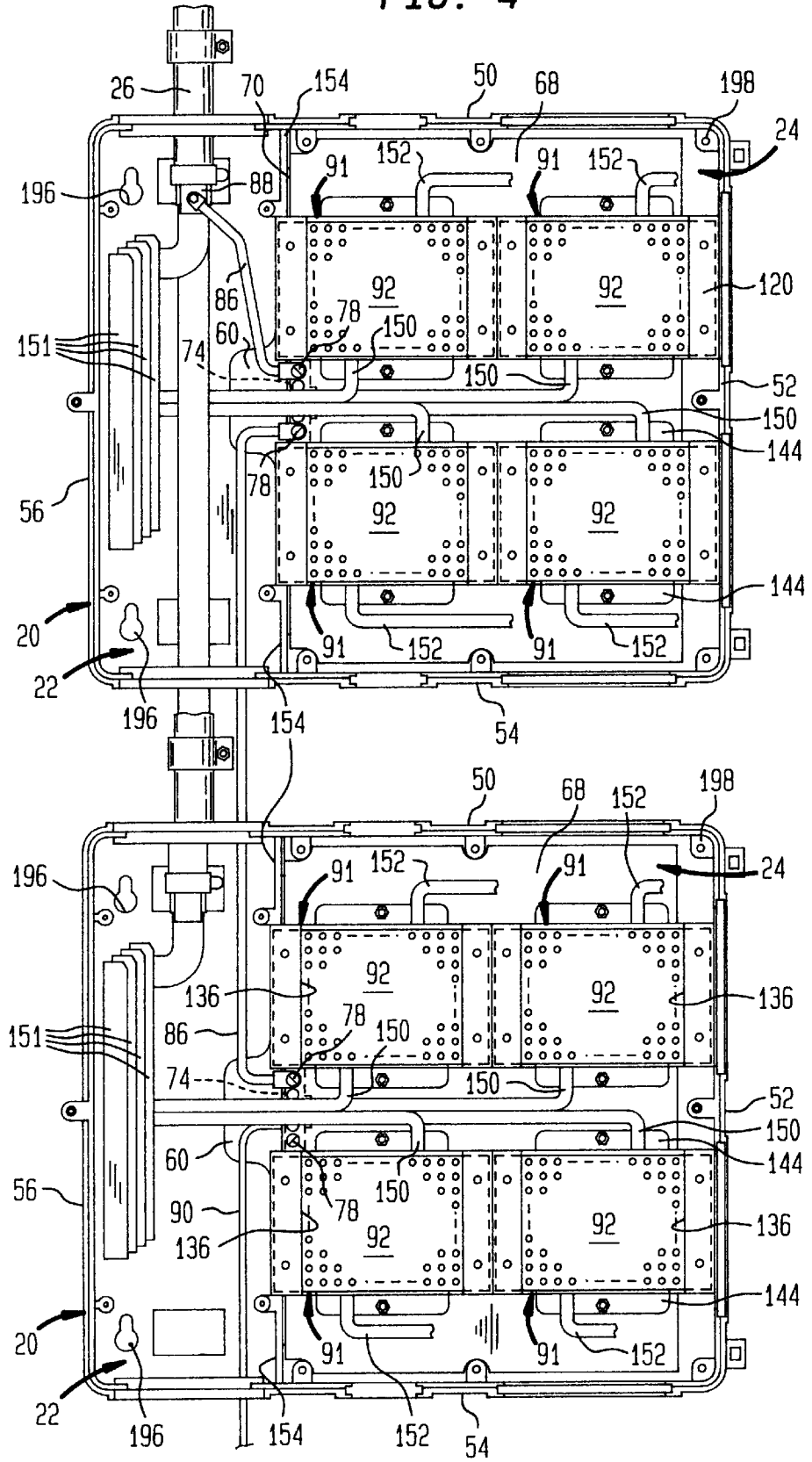
FIG. 4 shows a pair of stacked building entrance boxes with a modular form of protector field installed therein.

FIGS. 4–8 illustrate a building entrance box 20 using modular protector fields. Each module provides protection for twenty five pairs of wires. Modules are added as needed until the box is full. Partly filled boxes are used to reserve enough space for modules to be added later. Accordingly, the modules must be easily added, grounded and wired. As shown, this version of building entrance box includes a substantially planar conductive chassis plate 68 mounted within the open enclosure of the box 20 spaced from and parallel to the base wall 38. The chassis plate 68 is disposed within the connector chamber 24 and has an edge 70 adjacent to the splice chamber 22 and overlying the groove 58 of the base wall 38. When a plurality of boxes 20 are stacked, as shown in FIG. 4, a daisy chain of grounding wires must be provided between the boxes. In the past, this has been accomplished using bare number six gauge solid wire segments. The grounding connectors 72 for prior boxes were typically placed above and below the protector field 40, as shown in FIG. 2. To daisy chain the ground between stacked boxes required that the boxes be precisely aligned so that the stiff number six gauge solid wire could easily be routed from one box to the next. In addition, each box was typically provided with its own flexible ground conductor which is used to provide a ground connection to the input cable entering the box. With stacked boxes, only the flexible ground conductor of one box is used to ground the input cable passing through all the boxes and the flexible ground conductors of the other boxes are left unused. The arrangement of grounding connectors 74 shown in FIGS. 4 and 5 eliminates the aforedescribed problem encountered with the solid number six gauge solid wire and efficiently utilizes the available flexible ground conductors.

Figure 5:
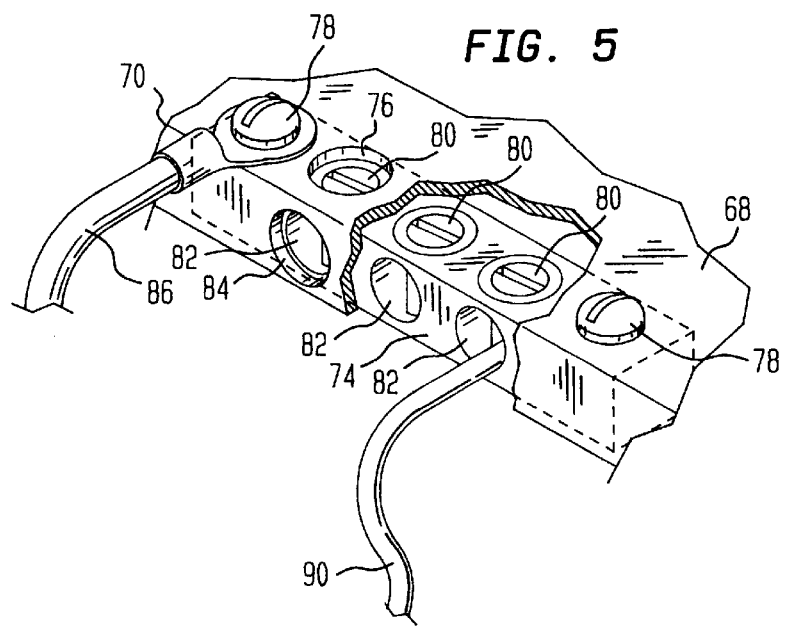
FIG. 5 is a perspective view showing the ground connector of the modular protector field of FIG. 4.

As shown in FIG. 5, the chassis plate 68 is bent downwardly along its edge 70 to form a corner. The chassis plate 68 is further formed with an array of openings 76 adjacent the edge 70 and along a line parallel to the edge 70. The grounding connector 74 is installed in the aforedescribed corner by means of headed screws 78 installed through respective openings 76 and into suitably threaded bores in the grounding connector 74, which is a solid rectilinear block of conductive material. Preferably, the screws 78 are located at opposite ends of the grounding connector 74 and between the screws 78 are bores holding set screws 80 accessible through respective openings 76. In addition, the grounding connector 74 is formed with bores 82 extending at right angles into the set screw bores, the bores 82 being accessible through openings 84 in the downwardly bent portion of the chassis plate 68. The downwardly bent portion of the chassis plate 68 extends into the groove 58 of the base wall 38 and the grounding connector block 74 fits in the recess 62 of the base wall 38. It is noted that when using the chassis plate 68 with modular protector fields, the aforedescribed potting in the groove 58 and recesses 60, 62 is not utilized.

Each box 20 is supplied with a flexible ground conductor 86 secured at one end to the upper one of the headed screws 78, when viewed as in FIG. 4. When the cable 26 is installed in the box 20, the other end of the flexible ground conductor 86 is secured to a conductive grounding clip 88 on the cable 26, as shown in the upper box in FIG. 4. When a plurality of boxes 20 are stacked, as shown in FIG. 4, the connection to the ground clip 88 is sufficient to provide a ground connection for the entire cable 26 going to all of the boxes 20. Therefore, it is unnecessary to connect the flexible ground conductor 86 of the lower box 20 to the cable 26. Instead, the lower flexible ground conductor 86 is routed into the splice chamber 22 of the lower box 20, into the splice chamber 22 of the upper box 20, and is connected to the grounding connector 74 of the upper box 20 by the lower headed screw 78. A local ground wire 90, which may be a number six gauge solid wire, is then connected to the grounding connector 74 of the lower box 20 by one of the set screws 80, as shown in FIG. 5, and may then be routed to a suitable local ground within the building.

Figure 6:
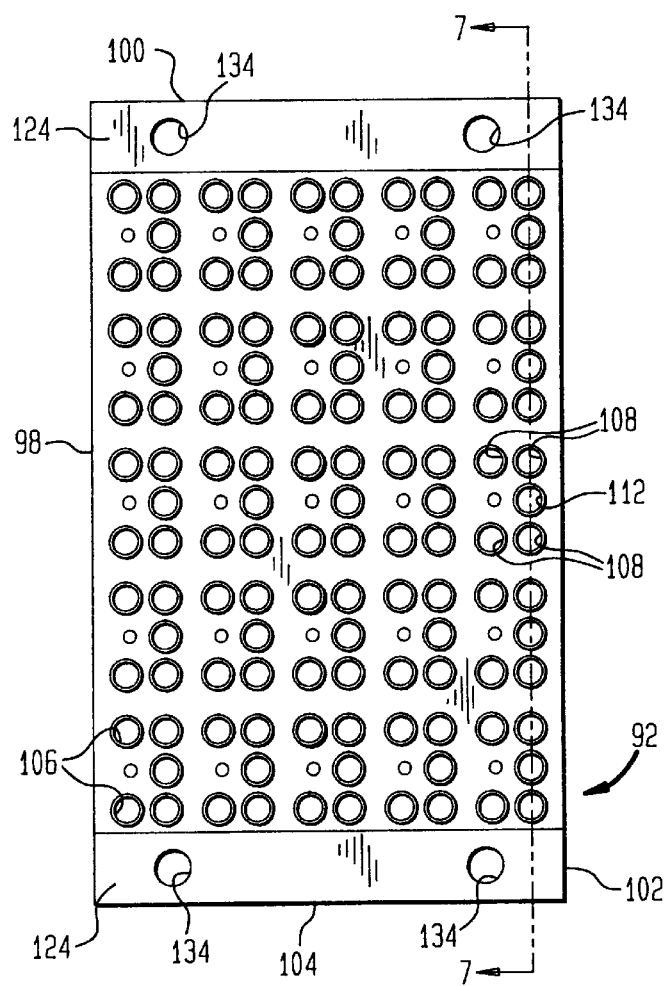
FIG. 6 is a top plan view showing the protector panel of the protector field shown in FIG. 4.
Figure 7:
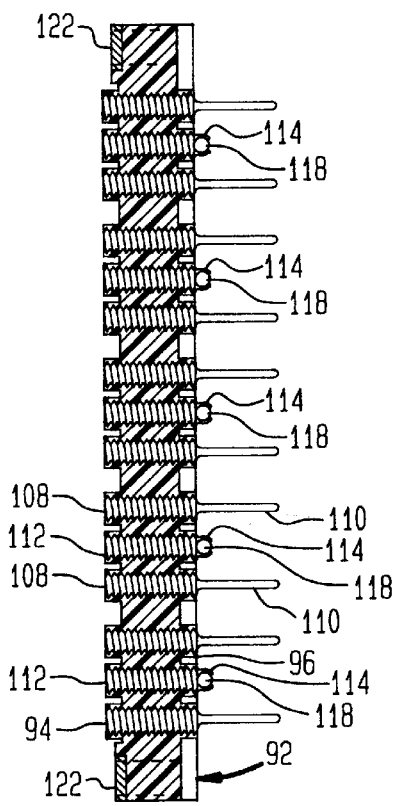
FIG. 7 is a cross sectional view taken along the line 7—7 in FIG. 6 showing the protector panel with the addition of ground conductors.

Illustratively, each modular protector field 91 provides protection for twenty five pairs of modules and up to four modules can be installed in a single box 20. It is required that the modules 91 be easily added, grounded and wired, with the input and output wires from all of the modules being separated so that they cannot short, and with the modules resisting shorting due to condensation without requiring potting. To satisfy these requirements, each protector module 91 includes an insulative protector panel 92, as best shown in FIGS. 6 and 7. The protector panel is a generally rectilinear block with a pair of opposed parallel major surfaces 94, 96 and four minor surfaces 98, 100, 102, 104 orthogonal to the major surfaces 94, 96. Formed in the panel 92 are sockets 106 which extend between the surfaces 94, 96 and orthogonally thereto. The sockets 106 are arrayed in groups, illustratively with five sockets to a group, where each group of sockets corresponds to the terminal arrangement of a protector block 42. The groups of sockets 106 are preferably arranged in a five-by-five array so that each protector panel 92 can accommodate twenty five protector blocks for twenty five telephone line pairs. Each of the sockets 106 holds a respective connector terminal 108 adapted to receive a mating terminal of a protector block. Of the five terminals in each group, four are provided with wire wrap tails 110 extending to the underside of the panel 92. These four connector terminals are the two input and two output connector terminals for each protector block. The fifth connector terminal 112 in each group is between the pair of input connector terminals and the pair of output connector terminals and functions as a ground connector terminal. Instead of a wire wrap tail, the end of the ground connector terminal 112 extending underneath the panel 92 is formed with a U-shaped clip 114, the function of which will be described hereinafter.

Figure 8:
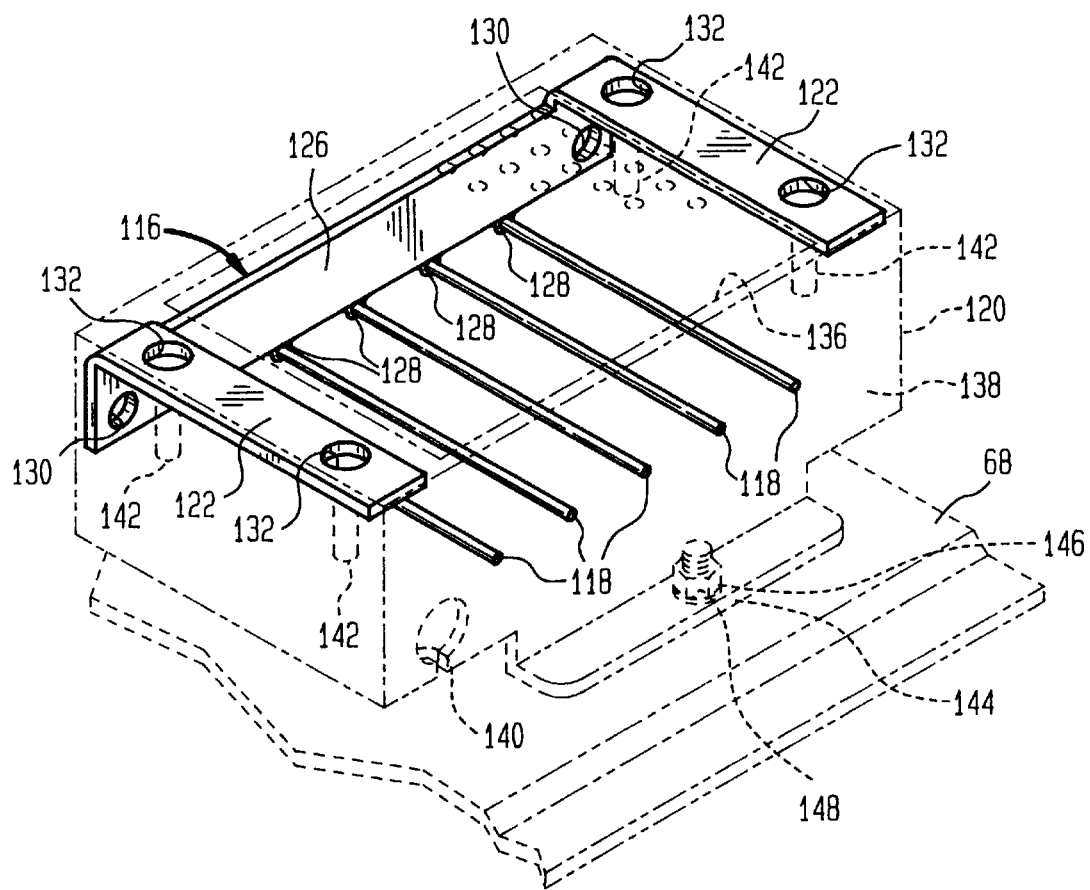
FIG. 8 is a perspective view of the grounding arrangement for the modular protector field of FIG. 4.

Grounding and mounting of each protector module 91 is accomplished by providing a conductive ground bar 116, five conductive ground rods 118, and a conductive mounting bracket 120. As best shown in FIG. 8, the ground bar 116 is a generally C-shaped piece of conductive sheet material which is bent so that its legs 122 overlie end portions 124 (FIG. 6) of the protector panel 92 and its connecting portion 126 is adjacent the minor surface 98 of the protector panel 92. Along the bottom edge of the connecting portion 126 are five U-shaped clips 128 which are each aligned with a row of the clips 114 of the ground connector terminals 112. For assembly, the ground bar 116 is placed adjacent the protector panel 92 with the legs 122 overlying the end portions 124 and the connecting portion 126 adjacent the minor surface 98. Screws (not shown) are then inserted through the openings 130 in the connecting portion 126 and into the protector panel 92 through its minor surface 98 to securely hold the ground bar 116 to the panel 92. With such mounting, the openings 132 in the legs 122 are aligned with the openings 134 in the end portions 124 of the panel 92. Each conductive ground rod 118 is then passed through an aligned row of clips 114 of ground connector terminals 112 and a clip 128 of the connecting portion 126. The clips 114, 128 are then deformed, as by pliers or the like, to be securely in contact with a respective rod 118 and are then soldered to the respective rod 118. Accordingly, all of the ground connector terminals 112 are in secure electrical contact with the ground bar 116.

The mounting bracket 120 is then placed over the aforedescribed assembly. The mounting bracket 120, is formed from conductive sheet material and is bent into a rectilinear shape to overlie the protector panel 92. The bracket 120 is formed with an opening 136 exposing all of the sockets 106 of the panel 92. As best shown in FIG. 8, the side wall 138 of the bracket 120 is formed with an opening 140 at one end and below the level of the panel 92 (when the panel 92 is installed, as will be described). Although not shown in FIG. 8, the opposing side wall of the bracket 120 is also formed with an opening corresponding to the opening 140 and diagonally across the bracket 120 from the opening 140. These openings allow bundles of wire to enter and exit the module 91 for connection to the wire wrap tails 110 below the panel 92. The pair of openings 140 are so situated on the opposing side walls that when the module 91 is rotated 180° about an axis orthogonal to the major surfaces 94, 96 of the panel 92, each of the openings 140 occupies the position previously occupied by the other of the openings 140.

The bracket 120 is provided with threaded studs 142 extending downwardly from the upper side of the bracket 120 and aligned with the openings 132 of the ground bar 116 and the openings 134 of the panel 92 end portions 124. Accordingly, when the assembled panel is installed into the bracket 120, the studs 142 extend beyond the bottom of the panel 92 and may have nuts (not shown) installed thereon to securely mount the assembled panel 92 to the bracket 120 and provide good electrical contact between the ground bar 116 and the bracket 120. The side wall 138, as well as the opposing side wall, is bent to form an outwardly extending mounting flange 144 on each side of the bracket 120. The mounting flange 144 is formed with a mounting hole for receiving an upwardly extending mounting stud secured to the chassis plate 68. A nut 148 threaded onto this stud 146 completes the mounting of the module 91 to the chassis plate 68 with secure electrical contact between the mounting bracket 120 and the chassis plate 68, thereby automatically grounding the ground connector terminals 112 of the panel 92.

All of the wires which are connected to the wire wrap tails 110 corresponding to the inputs of the protector blocks 42 are bundled together into a first cable which extends out through one of the openings 140, and all of the wires which are connected to the wire wrap tails 110 corresponding to the outputs of the protector blocks 42 are bundled together into a second cable which extends out through the other of the openings 140. Accordingly, the input wires are isolated from the output wires for each module 91. As shown in FIG. 4, the modules 91 are oriented on the chassis plate 68 so that when they are mounted in the upper of the two rows, the input cables 150 extend out the lower of the openings 140 and the output cables 152 extend out the upper of the openings 140. Conversely, when a protector module 91 is mounted in the lower row, its input cable 150 extends out the upper of the openings 140 and its output cable 152 extends out the lower of the openings 140. Thus, the input cables 150 of the protector modules 91 are routed from connectors 151 in the splice chamber 22 above the chassis plate 68 and between the two rows of protector modules 91. At the same time, each output cable 152 is routed between its module 91 and the closer one of the walls 50, 54 to a connector (not shown) in another layer (not shown) of the box 20. Thus, the input cables 150 and the output cables 152 of all of the modules 91 are isolated from each other. To provide additional isolation, the box 20 is formed with a pair of divider walls 154 which extend into the open enclosure each from one of the walls 50, 54. The divider walls 154 are along the plane separating the splice chamber 22 from the connector chamber 24. These divider walls 154 extends sufficiently into the open enclosure that their distal ends each butts up against a respective module 91, as best shown in FIG. 4, thereby closing off the space between that module and the respective wall 50, 54 from the splice chamber 22 to further insure isolation between the output cables 152 and the input cables 150.

Since it is disadvantageous to use potting on the protector modules 91 to prevent moisture condensation from shorting the terminals, some other way must be found to provide such protection. Moisture condenses on the plastic of the protector panel because, during temperature cycling, the temperature of the plastic lags behind the ambient temperature, allowing condensation of humidity in the ambient. To prevent such condensation, or at least to prevent the bridging of terminals by any such condensation, the bulk body of the panel 92 is minimized to thin out the plastic geometry of the panel 92. A thin geometry has a lowered temperature differential with the ambient temperature. This lowers the amount of condensation. Further, the panel block 92 is recessed from both of its major surfaces 94, 96 around each of the sockets 106 to increase the electrical path between each socket and all other sockets on the panel 92. Thus, in effect, the panel 92 can be considered to be a central planar plate having pairs of coextensive cylinders extending in opposite directions away from the plate, with each of the sockets 106 extending within a respective pair of opposed cylinders and through the central plate.

Figure 9:
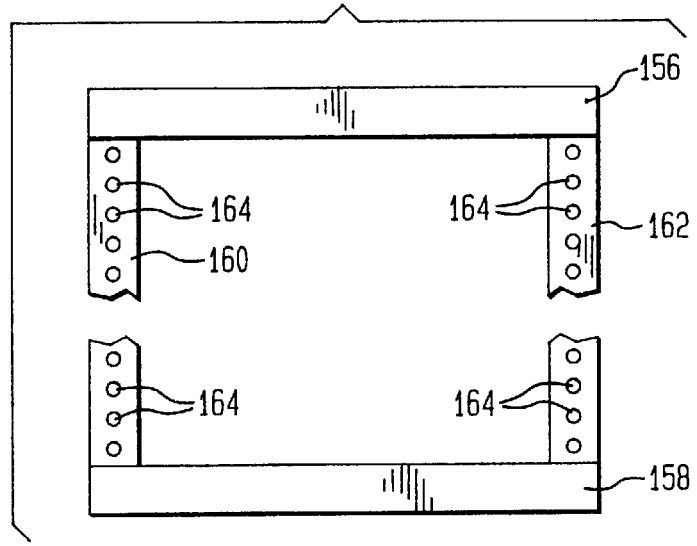
FIG. 9 illustrates a frame for the mounting of the box of FIG. 1.
Figure 10:
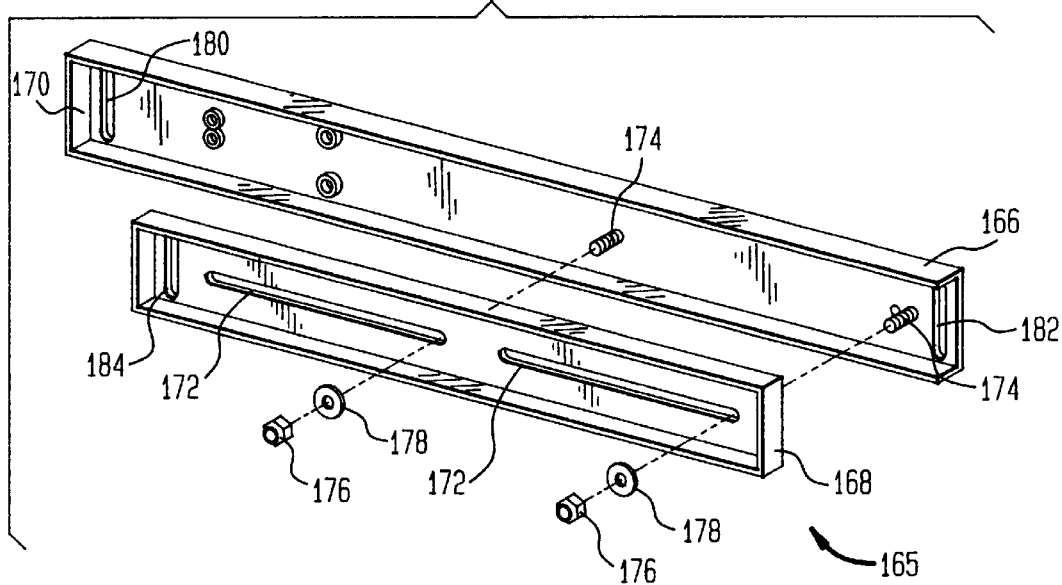
FIG. 10 is an exploded perspective view of a first embodiment of a bracket used for mounting the box of FIG. 1 to the frame of FIG. 9.
Figure 11:
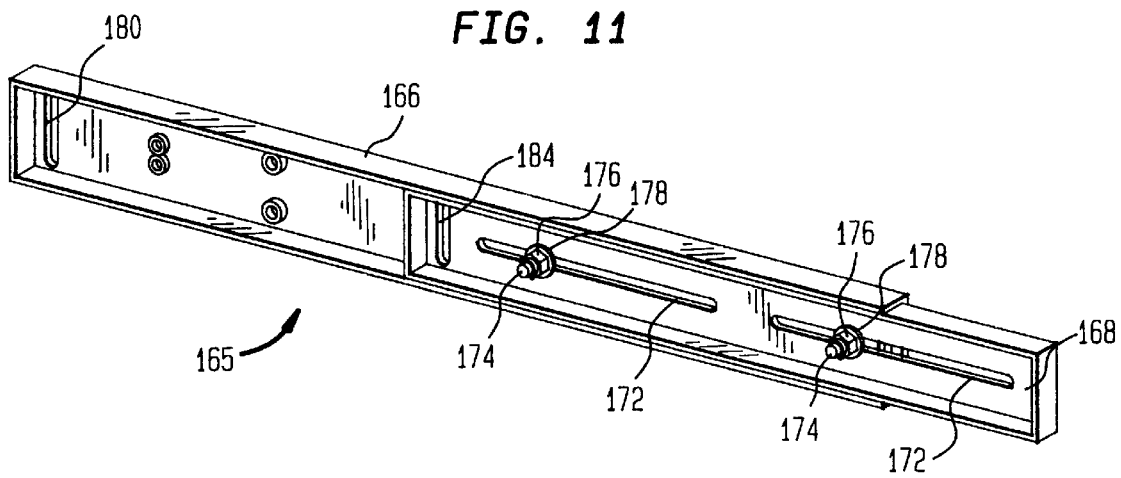
FIG. 11 is a perspective view showing the assembled bracket of FIG. 10.

FIG. 9 illustrates a typical frame for mounting and stacking building entrance boxes. The frame includes a horizontal top member 156 and a horizontal bottom member 158 which are parallel to and spaced from each other. Joining the top and bottom members 156, 158 are left and right vertical mounting beams 160, 162, each having an array of internally threaded mounting holes 164. When a plurality of boxes 20 are stacked, they must be vertically aligned in order to pass input cables through aligned splice chambers and align the output wires through aligned wiring guides. However, at any given installation, the horizontal spacing between the vertical mounting beams 160, 162 can vary. FIGS. 10 and 11 illustrate a first embodiment of a bracket assembly 165 which allows a box 20 to be installed to the frame of FIG. 9 in predetermined alignment to the mounting beam 162, to accommodate variability in spacing between the beams 160, 162. Thus, the bracket assembly 165 includes a first bracket member 166 and a second bracket member 168. The first bracket member 166 has a C-shaped cross section when viewed orthogonal to its longitudinal axis and is preferably closed at a first end 170. The second bracket member 168 is also generally C-shaped in cross section with both ends closed and is sized to fit for sliding longitudinal motion within the interior of the first bracket member 166, as best seen in FIG. 11.

Figure 12:
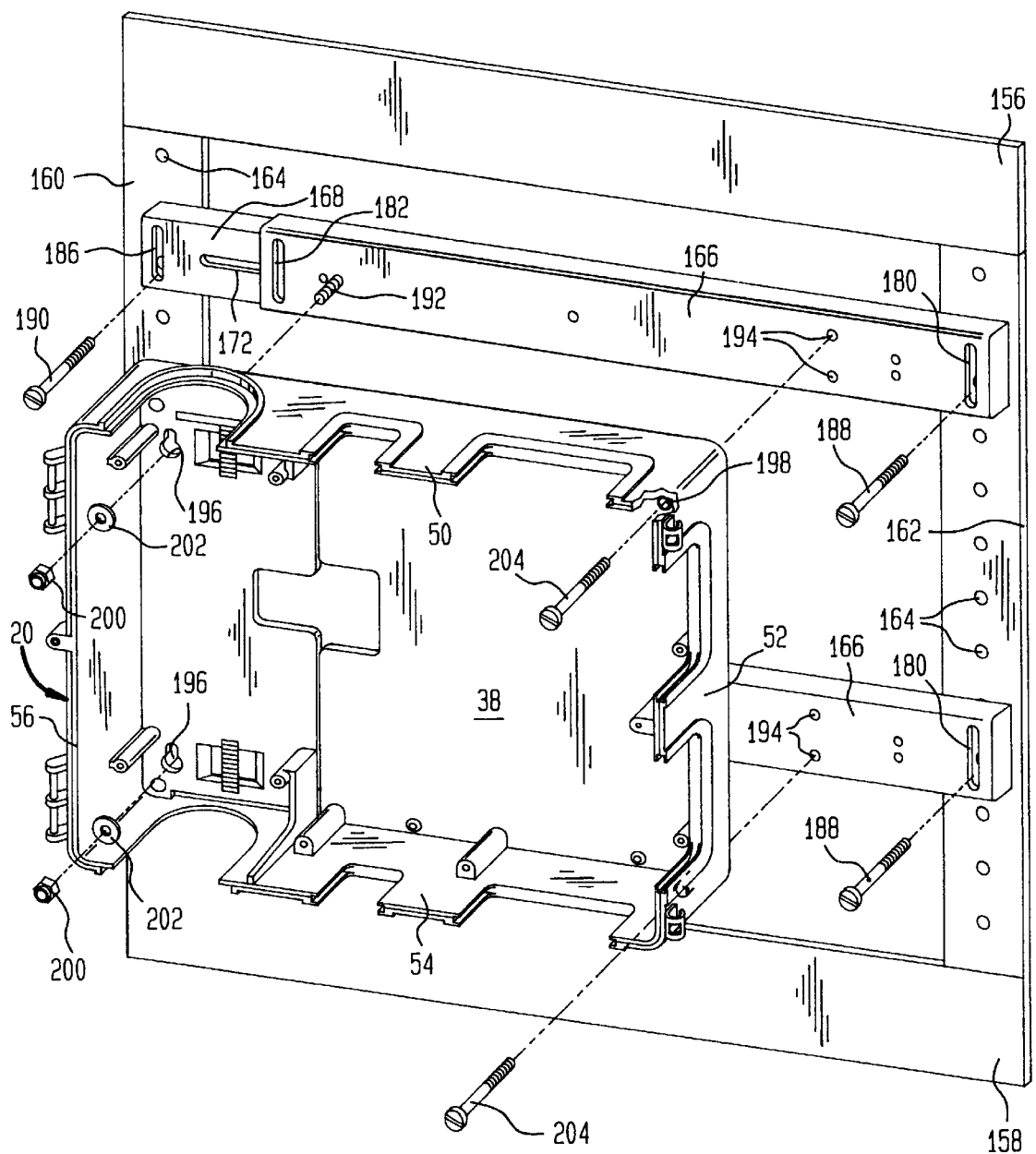
FIG. 12 illustrates the mounting of the box shown in FIG. 1 to the frame shown in FIG. 9 using a pair of the brackets shown in FIGS. 10 and 11.

The second bracket member 168 is formed with a pair of open longitudinal slots 172 and the first bracket member 166 is formed with a pair of threaded posts 174 which are received each within a respective one of the slots 172. Nuts 176 and washers 178 engage the posts 174 to secure the bracket member 168 to the bracket member 166 with the overall length of the bracket assembly 165 being selectively variable. The bracket member 166 has a pair of elongated slots 180, 182 at its opposite ends, the slots 180, 182 being elongated in a direction orthogonal to the length of the bracket member 166. Similarly, the bracket member 168 has a pair of elongated slots 184, 186 (FIG. 12) at its opposite ends, also elongated in a direction orthogonal to the length of the bracket member 168. As best seen in FIG. 12, the bracket assembly 165 is mounted to the frame by a first screw 188 which extends through the slot 180 and into a threaded mounting hole 164 of the mounting beam 162 and a second screw 190 which extends through the slot 186 of the bracket member 168 and into a threaded mounting hole 164 of the mounting beam 160. This arrangement provides a predetermined alignment between the bracket member 166 and the mounting beam 162 and another predetermined alignment between the bracket member 168 and the mounting beam 160, while allowing variation of the alignment between the bracket members 166, 168.

The bracket member 166 is formed on its exterior, which is away from the mounting frame, with a threaded post 192 and with threaded openings 194. The spacing between the post 192 and the openings 194 corresponds to the spacing between mounting holes 196, 198 in the base wall 38 of the box 20. Thus, the post 192 extends through the mounting hole 196 and has a nut 200 and washer 202 installed thereon, and a screw 204 extends through the mounting hole 198 into an appropriate one of the threaded openings 194. It is noted that there are a pair of vertically displaced threaded openings 194 in each of the bracket members 166. The upper one of these threaded openings 194 is for use with the upper mounting hole 198 of the box 20 and the lower one is for use with the lower mounting hole 198 of the box 20, as best seen in FIG. 12. The slots 180, 186 allow for vertical adjustment of the bracket assembly 165 to insure that it is aligned with the mounting holes 196, 198 of the box 20. Since the post 192 and the openings 194 are fixed on the bracket member 166, the box 20 is always precisely aligned with the bracket member 166, which is precisely aligned with the mounting beam 162. Accordingly, when a plurality of boxes 20 are mounted to the frame by the aforedescribed bracket assembly, they are always precisely vertically aligned. Another function of the vertical slots 180, 186 is to eliminate a gap between stacked boxes 20.

FIGS. 13–17 illustrate another embodiment of a bracket 206 for mounting a box 20 to the frame shown in FIG. 9. The bracket 206 is similar to the bracket member 168, having a slot 180 at its closed end. However, there are several slots 186 at its open end, each corresponding to a different fixed spacing between mounting beams 160, 162. The bracket 206 is formed with weakened portions 208 outboard of the slots 186. Preferably, each of the weakened portions 208 consists of a V-shaped groove 210 formed in the material of the bracket 206, which is preferably metal sheet stock, along with apertures 212 formed in each corner of the C-shaped cross section of the bracket 206. As shown in FIG. 17, the weakened portion 208 is preferably formed before the bracket 206 is bent into its C-shape by forming the V-shaped groove 210 across the width of the bracket 206 while still flat and punching the apertures 212 at the intersections of the groove 210 and the subsequent bend lines 214. After a technician has determined the proper length of the bracket 206, the bracket 206 is cut with a cutter along the groove 210 at both ends up to the apertures 212. The bracket 206 is then bent back and forth until it snaps along the groove 210 between the apertures 212. Accordingly, the bracket 206 can be separated along a weakened portion 208 without requiring sawing of the bracket. Thus, excess length of the bracket, which would otherwise stick out beyond the mounting beam 160 and be potentially injurious, can be removed.

Accordingly, there has been disclosed an improved building entrance box and mounting structure therefor. While an exemplary embodiment of the present invention has been disclosed herein, it will be appreciated by those skilled in the art that various modifications and adaptations to the disclosed embodiment may be made and it is intended that this invention be limited only by the scope of the appended claims.

What is claimed is:

1. A building entrance protector box providing an interface between a signal transmission media cable having a first plurality of filamentary signal transmission elements and a second plurality of individual filamentary signal transmission elements, the box being divided into a splice chamber receiving the cable and a connector chamber receiving the second plurality of individual filamentary signal transmission elements, and wherein a protector field is disposed in the connector chamber to which the second plurality of individual filamentary signal transmission elements is terminated and a third plurality of individual filamentary signal transmission elements extends from the splice chamber to the connector chamber, with each of the third plurality of individual filamentary signal transmission elements being terminated at one end to the protector field and at the other end to a respective one of said first plurality of filamentary signal transmission elements, the box comprising:

a housing having a substantially planar base wall adapted for mounting to a support and a plurality of substantially planar surrounding walls each substantially perpendicular to said base wall so as to define an open enclosure containing said splice chamber and said connector chamber;

a substantially planar mounting plate mounted within said open enclosure spaced from and parallel to said base wall and disposed within said connector chamber, said mounting plate adapted to have said protector field mounted thereon;

a protector module mounted to said mounting plate to form said protector field and including:

an insulative protector panel having formed therein a plurality of sockets;

a plurality of connector terminals each disposed in a respective one of said sockets and adapted to receive mating terminals of respective protector elements;

a mounting bracket covering at least part of said panel and having a mounting flange adapted to engage said mounting plate and be secured thereto so that said panel is secured to said mounting plate, said mounting bracket having a side portion transverse to said mounting flange, said side portion being formed with a pair of openings therethrough with said pair of openings being so situated on said side portion that when said protector module is rotated 180° about an axis orthogonal to said mounting plate, the pair of openings each occupies the position previously occupied by the other of the pair of openings;

a first cable extending through a first of said pair of mounting bracket openings, said first cable containing said third plurality of individual filamentary signal transmission elements and being terminated at respective ones of said plurality of connector terminals; and a second cable extending through the other of said pair of mounting bracket openings, said second cable containing said second plurality of individual filamentary signal transmission elements and being terminated at respective ones of said plurality of connector terminals;

wherein when more than one protector module is mounted to said mounting plate, the more than one protector modules can be oriented on the mounting plate so that the first cables of all of the more than one protector modules are isolated from the second cables of all of the more than one protector modules.

2. The box according to claim 1 wherein:

said protector panel is rectilinear with a pair of opposed parallel major surfaces;

said mounting bracket is formed from a piece of sheet material to extend over one of said pair of major surfaces, is bent orthogonal to said one of said pair of major surfaces to form a pair of opposed side portions, and is bent parallel to said one of said pair of major surfaces to form said mounting flange; and said pair of openings extend each through a respective one of said opposed side portions.

3. The box according to claim 2 wherein:

said housing further includes a planar divider wall perpendicular to said base wall and extending into said open enclosure from one of said surrounding walls adjacent said mounting plate and along a plane separating said splice chamber from said connector chamber; and said protector module is mounted to said mounting plate with said opposed side portions extending orthogonal to said divider wall.

4. The box according to claim 3 wherein: said mounting plate can accommodate four identical ones of said protector module in a two row by two row array spaced so that the first cables of all of the modules extend into the splice chamber between two rows of the modules and the second cables of all of the modules extend between their respective one of said modules and one of the surrounding walls of the housing; and said divider wall includes a pair of divider walls each extending into the open enclosure from a respective one of said surrounding walls beyond a separation between said respective one of said surrounding walls and a row of the modules which is closest to said respective one of said surrounding walls.

* * * * *